United States Patent
Wang et al.

(10) Patent No.: US 11,192,347 B2
(45) Date of Patent: Dec. 7, 2021

(54) HIGH PERFORMANCE PLASTIC MAGNETIC MATERIALS AND PREPARATION METHOD THEREOF

(71) Applicant: Guangzhou Newlife Mew Material Co., LTD, Guangzhou (CN)

(72) Inventors: Xiaoming Wang, Guangzhou (CN); Ronggen Ye, Guangzhou (CN); Guoming Wu, Guangzhou (CN); Zhiqiang Chen, Guangzhou (CN)

(73) Assignee: GUANGZHOU NEWLIFE NEW MATERIAL CO., LTD, Guangzhou (CN)

( * ) Notice: Subject to any disclaimer, the term of this patent is extended or adjusted under 35 U.S.C. 154(b) by 312 days.

(21) Appl. No.: 15/896,526

(22) Filed: Feb. 14, 2018

(65) Prior Publication Data
US 2019/0054722 A1 Feb. 21, 2019

(30) Foreign Application Priority Data
Aug. 15, 2017 (CN) .......................... 201710695684.5

(51) Int. Cl.
| | | |
|---|---|---|
| B32B 27/14 | (2006.01) |
| C09J 7/38 | (2018.01) |
| B32B 5/16 | (2006.01) |
| B32B 27/36 | (2006.01) |
| B32B 37/15 | (2006.01) |
| B32B 29/04 | (2006.01) |
| B32B 27/32 | (2006.01) |
| C09J 183/04 | (2006.01) |
| C09J 7/29 | (2018.01) |
| B32B 37/12 | (2006.01) |

(52) U.S. Cl.
CPC ............ *B32B 27/14* (2013.01); *B32B 5/16* (2013.01); *B32B 27/32* (2013.01); *B32B 27/36* (2013.01); *B32B 29/04* (2013.01); *B32B 37/1284* (2013.01); *B32B 37/153* (2013.01); *C09J 7/29* (2018.01); *C09J 7/38* (2018.01); *C09J 183/04* (2013.01); *B32B 2255/04* (2013.01); *B32B 2255/26* (2013.01); *B32B 2264/105* (2013.01); *B32B 2307/208* (2013.01); *C08K 2201/01* (2013.01); *C09J 2301/41* (2020.08); *C09J 2483/00* (2013.01); *Y10T 428/1476* (2015.01); *Y10T 428/2848* (2015.01)

(58) Field of Classification Search
None
See application file for complete search history.

(56) References Cited

U.S. PATENT DOCUMENTS

| | | | | |
|---|---|---|---|---|
| 5,576,110 A | * | 11/1996 | Lin ........................ | C09J 183/04 |
| | | | | 428/447 |
| 2008/0138618 A1 | * | 6/2008 | Sasaki ................... | C09J 139/06 |
| | | | | 428/345 |
| 2012/0172543 A1 | * | 7/2012 | Cray ...................... | C08G 77/44 |
| | | | | 525/477 |

FOREIGN PATENT DOCUMENTS

| | | | | |
|---|---|---|---|---|
| CN | 203496503 U | * | 3/2014 | |
| CN | 104130740 A | * | 11/2014 | |
| CN | 104231708 A | * | 12/2014 | ............... C09D 5/23 |
| CN | 105969299 A | * | 9/2016 | |

OTHER PUBLICATIONS

Wang, Xioming et al., "Preparation Method of Residue Free Adhesive Advertisement Consumable", machine translation CN105969299A, Sep. 28, 2016 (Year: 2016).*
Wang, Xioming et al., "Soft Magnetic Coating Used Multiple Polar Static Magnetic Field, and Preparation Method of Soft Magnetic Coating", machine translation CN104231708A, Dec. 24, 2014 (Year: 2014).*
Wu, Guoming et al., "Magnetic Whiteboard Film Convenient To Implement", machine translation CN203496503U, Mar. 26, 2014 (Year: 2014).*
Wang, Xiping et al., "High Stripping Force PET (Polyethylene Terephthalate) Protective Film Pressure Sensitive Adhesive and Preparation Method Thereof", machine translation CN104130740A, Nov. 5, 2014 (Year: 2014).*
Wang, Xiao-ming et al., "Soft Magnetic Coating Used In Multipolar Static Magnetic Field, and Preparation Method Thereof", English translation of CN 104231708 A, Dec. 24, 2014 (Year: 2014).*
Wu, Guoming et al., Convenient-To-Apply Magnetic Whiteboard Film, English translation of CN203496503U, Mar. 26, 2014 (Year: 2014).*

* cited by examiner

*Primary Examiner* — Anish P Desai
(74) *Attorney, Agent, or Firm* — Vivacqua Crane, PLLC

(57) ABSTRACT

The invention discloses a high performance plastic magnetic material, comprising a low surface energy layer, a magnetic layer and a printable layer, wherein the magnetic layer and the printable layer are arranged successively on a first side of the low surface energy layer; the low surface energy layer is an organic silicon pressure sensitive adhesive layer. The invention further discloses a preparation method, comprising the following steps: pretreating a magnetic powder with a coupling agent; mixing the pretreated magnetic powder with matrix components and auxiliaries to gain a mixture; extrusion compositing the gained mixture with a printable layer to gain composite paper having the printable layer and a magnetic layer; and applying a low surface energy layer on a side of the magnetic layer, opposite the printable layer. As no UV layer and no adhesive residue, the material of the invention is environmentally friendly and highly reliable.

3 Claims, No Drawings

HIGH PERFORMANCE PLASTIC MAGNETIC MATERIALS AND PREPARATION METHOD THEREOF

CROSS-REFERENCE TO RELATED APPLICATION

This application is based on and claims the benefit of priority from Chinese Patent Application No. 201710695684.5, filed on 15 Aug. 2017, the contents of which are incorporated by reference.

FIELD

The invention relates to a high performance plastic magnetic material and a preparation method thereof.

BACKGROUND

Conventional rubber magnet and plastic magnet, such as fridge magnet, magnetic doll, magnetic postcard, magnetic car sticker, magnetic consumable, all utilize the magnetic attraction force principle of magnetic materials. Attraction of ferroic surface materials/articles on the surface of magnetic substrate, or attraction of magnetic surface materials/articles on the surface of iron plate or ferroic paint can achieve repeatedly sticking at will without use of any adhesive, successfully avoid the problem of resource waste and residual adhesive of disposable use. On the one hand, the magnetic attraction force is dependent on the content of the magnetic powder, the higher the content of the magnetic powder, the greater the attraction force. On the other hand, the higher is the content, it is easier to occur powder falling and wipe blackening. The problem of wipe blackening or powder falling can be alleviated or solved by matte UV curing surface treatment, however, UV treatment results in high hardness, small friction coefficient and significant decrease of friction force, therefore, we must increase the thickness of the magnetic materials or improve their performances, thus cause resource waste. Meanwhile, UV oil has a high cost and is odorous, and UV monomer and solvent are very corrosive, skin allergy easily occurs during contact, thus put forward high requirements for operation. In addition, the thickness of UV affect the performance of the product, when the thickness is too thick, the attraction force decreases, the product becomes brittle and easily breaks off. When the thickness is too thin, there are disadvantages, such as insufficient curing or matting powder separating out etc. After long storage, the product may occur blackening during attraction and even damage the surface of attracted articles, such as refrigerator door, car, seriously affect safe usage and reliability of the product.

On the other hand, the magnetic attraction force is dependent on the performance of the magnetic powder. The maximum magnetic energy product (BH) of bonded strontium ferrite is 5-12 KJ/m, and the maximum magnetic energy product (BH) of bonded neodymium iron boron is 30-40 KJ/m. The higher is the performance, the higher is the cost and the less is the availability of raw materials, such as rare earth permanent magnetic materials—samarium cobalt (SmCo) permanent magnetic materials and neodymium iron boron (NdFeB) permanent magnetic materials. The cost of rare earth permanent magnetic materials is 30-80 times of general strontium ferrite permanent magnetic materials. In addition, due to extremely easy oxidation of NdFeB, its surface needs to be treated, and it is difficult to be processed into thin (below 0.5 mm) and wide (above 1000 mm) products. Their super-high performance may only be used for molded or sintered permanent magnet, and may not be used for conventional rolled rubber magnet and plastic magnet.

Many technicians combine general pressure-sensitive adhesive with conventional rubber magnet and plastic magnet to improve attraction force and reliability of the products. However, poor weatherability and residual adhesive problem of the general pressure-sensitive adhesive bring great inconvenience to user. Adhesive residue mainly results from short molecular chain, low molecular weight and low cohesion of the resin used by the pressure sensitive adhesive. In addition, general pressure sensitive adhesive is firstly applied on the surface of release film or release paper, then bonded with the surface of magnetic material, therefore, its interlayer adhesion force is low, when contact with bonded article for a long time, due to creep of molecular chain, it is easy to occur adhesive residue, pollution and bonded article surface damage.

SUMMARY

The object of the invention is to provide a high performance plastic magnetic material and a preparation method thereof.

According to an aspect of the invention, the high performance plastic magnetic material comprises a low surface energy layer, a magnetic layer and a printable layer, wherein the magnetic layer and the printable layer are arranged successively on a first side of the low surface energy layer; the low surface energy layer is an organic silicon pressure sensitive adhesive layer.

Further, the organic silicon pressure sensitive adhesive layer is prepared from the following raw materials: 100 parts of vinyl-terminated polysiloxane, 100-150 parts of solvent, 1-5 parts of crosslinking agent, 1-5 parts of accelerator, and 1-5 parts of catalyst.

Further, the magnetic layer comprises the following components: 50% wt-90% wt magnetic powder, 7% wt-50% wt matrix component and 0-3% wt auxiliaries.

Further, the printable layer is selected from a group consisting of paper, printable and writable plastic film, textile film, printable coating, and combinations thereof.

Further, the vinyl-terminated polysiloxane is selected from a group consisting of vinyl-terminated dimethyl (siloxane and polysiloxane), vinyl-terminated poly (dimethyl siloxane) and combinations thereof, and the vinyl-terminated polysiloxane has a viscosity of 8000-30000 mpa·s/25° C.

The high performance plastic magnetic material further comprises a release film arranged on a second side of the low surface energy layer, opposite the first side.

Further, the crosslinking agent is hydrosilicone oil, the catalyst is platinum compounds and/or platinum complexes, and the accelerator is a coupling agent.

Further, the magnetic powder is at least one of hard magnetic material powder and soft magnetic material powder.

Further, the matrix component is thermoplastic plastics or thermoplastic elastomers.

According to another aspect of the invention, the preparation method for the high performance plastic magnetic material includes the following steps: pretreating a magnetic powder with a coupling agent; mixing the pretreated magnetic powder with matrix components and auxiliaries to gain a mixture; extrusion compositing the gained mixture with a printable layer to gain composite paper having the printable layer and a magnetic layer; and applying a low surface energy layer on a side of the magnetic layer, opposite the printable layer.

As no UV layer is contained, the high performance plastic magnetic material of the invention is environmentally friendly, and highly reliable. The material provided by the invention has no adhesive residue, and thus would not damage the surface of the article attracted. In addition, the preparation method of the material is simplified. Specifically:

1. The high performance plastic magnetic material of the invention comprises no UV curing layer, whereby the pollution caused by solvent to the environment is reduced; moreover, due to its simplified structure, the high performance plastic magnetic material of the invention has a more environmentally friendly production process, and no dry linting and dusting occurs.

2. According to the invention, the ingredients of the magnetic layer are reduced, material utilization is improved and cost is lowered.

3. The high performance plastic magnetic material of the invention has high reliability, no adhesive residue while removed from the surface of the attracted article, and will not damage the surface of the attracted article.

4. The preparation method of the invention is simple, and highly efficient.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

The high performance plastic magnetic material of the invention comprises a low surface energy layer, a magnetic layer and a printable layer, wherein the latter two layers are successively arranged on the surface of a first side of the low surface energy layer, and the low surface energy layer is an organic silicon pressure sensitive adhesive layer.

Preferably, the organic silicon pressure sensitive adhesive layer is prepared from the following raw materials: 100 parts of vinyl-terminated polysiloxane, 100-150 parts of solvent, 1-5 parts of crosslinking agent, 1-5 parts of accelerator and 1-5 parts of catalyst.

Preferably, the magnetic layer comprises the following components: 50% wt-90% wt magnetic powder, 7% wt-50% wt matrix component and 0-3% wt auxiliaries.

Preferably, the printable layer is paper, printable and writable plastic film, textile film or printable coating. More preferably, the paper is selected from a group consisting of general writing paper, art paper, inkjet printing paper, high-gross or matte photo paper, synthetic paper, etc., and combinations thereof.

The vinyl-terminated polysiloxane is selected from a group consisting of monovinyl-terminated dimethyl (siloxane and polysiloxane), vinyl-terminated poly (dimethyl siloxane), and combinations thereof. The vinyl-terminated poly (dimethyl siloxane) has a formula as follows:

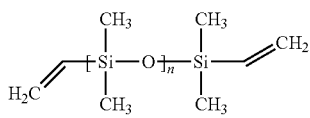

More preferably, the viscosity of the vinyl-terminated polysiloxane is 8000-30000 mpa·s/25° C.

Preferably, the high performance plastic magnetic material of the invention further comprises a release film arranged on a second side of the low surface energy layer, opposite the first side.

Preferably, the crosslinking agent is hydrosilicone oil, and more preferably, its hydrogen content is 0.5-2% wt.

Preferably, the catalyst is platinum compound and/or platinum complex, for example, solution of chloroplatinic acid in isopropyl alcohol, platinum-tetramethyl-divinyldisiloxane complex, and platinum-tetramethyl-tetravinyl-cyclotetrasiloxane complex.

Preferably, the accelerator is a coupling agent, more preferably, at least one of a silane coupling agent, a titanate coupling agent, an aluminate coupling agent, a zirconate coupling agent, and a rare earth coupling agent, and more preferably, a silane coupling agent, for example, at least one of KH550, KH560, and KH570.

After drying, the low surface energy layer prepared from the above raw materials has the properties of: thickness: 5-50 μm; initial tack: 2-8 # ball, holding power: no slip after 24 hr.

Preferably, the magnetic powder is at least one of hard magnetic material powder and soft magnetic material powder; the hard magnetic material powder is selected from strontium ferrite magnetic powder and barium ferrite magnetic powder, and the soft magnetic material powder is selected from iron, cobalt and nickel powders, and powders of compounds containing iron, cobalt and nickel. The relevant definitions of the hard magnetic material and the soft magnetic material can be seen in relevant national standards, for example, GB/T 21219-2007 Magnetic materials—Classification. According to the national standard GB/T 21219-2007, hard (permanent) magnetic materials have a coercive force of >1,000 A/m; soft magnetic materials have a coercive force of ≤1,000 A/m.

The matrix component is thermoplastic plastics or thermoplastic elastomers, and more preferably at least one of PE, PP, POE, EVA, EAA, EEA, TPE, TPU, SEBS, and SBS.

Preferably, the auxiliary is at least one of antioxidant, lubricant, coupling agent, ultraviolet absorber and dispersant.

Preferably, according to the invention, the low surface energy layer has a thickness of 5-50 μm, and the magnetic layer has a thickness of 0.10-1.0 mm and a width of 3000 mm.

The preparation method of the high performance plastic magnetic material according to the invention comprises the following steps: pretreating the magnetic powder with the coupling agent; mixing the pretreated magnetic powder with the matrix component and the auxiliaries to gain a mixture; extrusion compositing the gained mixture with the printable layer to gain composite paper having the printable layer and the magnetic layer; and applying a low surface energy layer on a side of the magnetic layer, opposite the printable layer. Specifically:

Step 1: pretreating the magnetic powder with the coupling agent, mixing the pretreated magnetic powder with the thermoplastic resin and the auxiliary at a given ratio to obtain the mixture 1, and on-line thermal compounding the mixture 1 with the printable layer by extrusion, in a manner of bonding without adhesive, to have a functional film 1.

Step 2: mixing the vinyl-terminated polysiloxane and the solvent thoroughly, adding the crosslinking agent and the accelerator in and mixing the materials thoroughly, and then adding catalyst in and stirring thoroughly.

Step 3: applying the liquid prepared in step 2 on a surface of the function film 1, opposite the printable layer, and curing for 3-8 min at 90° C.–130° C. to prepare the low surface energy layer.

Preferably, the method of the invention further comprises step 4: arranging the release film on a side of the low surface energy layer, opposite the functional file 1, and rolling up the finished product.

The invention is further illustrated by the following examples:

Example 1

The high performance plastic magnetic material of the invention comprises a low surface energy layer, a magnetic layer and a printable layer.

The low surface energy layer is made of organic silicon pressure sensitive adhesive, having a raw material mixture ratio (mass part) as follows: 100 parts of vinyl-terminated dimethyl (siloxane and polysiloxane), 100 parts of solvent toluene, 2 parts of crosslinking agent hydrosilicone oil (hydrogen content: 1.5% wt), 1 part of accelerator KH550 and 3 parts of catalyst solution of chloroplatinic acid in isopropyl alcohol. The monovinyl-terminated dimethyl (siloxane and polysiloxane) and solvent are added into a vessel and stirred therein therein thoroughly; the crosslinking agent and accelerator are successively added in; and 10-15 min later, the catalyst is finally added in and stirred thoroughly. The viscosity of the monovinyl-terminated dimethyl (siloxane and polysiloxane) is 10000 mpa·s.

The raw material ratio of the magnetic layer is: 85% wt magnetic powder, 14% wt matrix component thermoplastic resin and 1% wt auxiliary. The magnetic powder is strontium ferrite, the matrix component is a mixture of polypropylene (PP) and POE (mass ratio=1:1), the auxiliaries are antioxidant 1010, coupling agent, and lubricant stearic acid (mass ratio=1:1:1).

The printable layer is a PET erasable film suitable for whiteboard pen writing, or a pp film suitable for writing with dust-free chalk, liquid pen and water soluble chalk.

Step 1: pretreating the magnetic powder with the coupling agent; mixing the pretreated magnetic powder with the thermoplastic resin, the auxiliaries at the abovementioned ratio to form a mixture; on-line bonding the mixture with the printable layer by extrusion compounding to obtain the function film 1, i.e., bonding the magnetic layer with the printable layer.

Step 2: applying the prepared low surface energy layer liquid on the surface of the magnetic layer of the function film 1, through a comma blade application process, wherein the maximum temperature is 130° C., the curing time is 5 min, the thickness of the prepared low surface energy layer is 20 micron, and the thickness of the low surface energy layer is controlled by the adjustment of the blade gap.

Step 3: bonding the PE release film before rolling up.

Example 2

The high performance plastic magnetic material of the invention comprises a low surface energy layer, a magnetic layer and a printable layer.

The low surface energy layer is made of organic silicon pressure sensitive adhesive, and has a raw material ratio (mass part) as follows: 100 parts of vinyl-terminated poly (dimethyl siloxane), 150 parts of solvent ethyl acetate, 3 parts of crosslinking agent hydrosilicone oil (hydrogen content: 1.5% wt), 2 part of accelerator KH560 and 2 parts of catalyst solution of chloroplatinic acid in isopropyl alcohol. The vinyl-terminated poly (dimethyl siloxane) and solvent are added into a vessel and stirred thoroughly; the crosslinking agent and the accelerator are successively added in; and 10-15 min later, the catalyst is added in and stirred thoroughly. The viscosity of vinyl-terminated poly (dimethyl siloxane) is 20000 mpa·s.

The raw material ratio of the magnetic layer is: 85% wt magnetic powder, 14% wt matrix component thermoplastic resin, 1% wt auxiliaries. The magnetic powder is strontium ferrite, the matrix component is a mixture of polyethylene (PE) and EVA (mass ratio=1:1), the auxiliaries are antioxidant 1010, coupling agent, and lubricant stearic acid (mass ratio=1:1:1).

The printable layer is paper or PET film having printable coating.

Step 1: pretreating the magnetic powder with the coupling agent; mixing the pretreated magnetic powder with the thermoplastic resin, auxiliaries at the above-mentioned ratio to form a mixture; and on-line bonding the mixture with the printable layer through extrusion compounding to obtain the function film 1, i.e., bonding the magnetic layer with the printable layer.

Step 2: applying the prepared low surface energy layer liquid on the surface of the magnetic layer of the function film 1, through an anilox roller coating process, wherein the maximum temperature is 130° C., the curing time is 4 min, the thickness of the prepared low surface energy layer is 10 micron, and the thickness of the low surface energy layer is controlled by the mesh number of the anilox roller.

Step 3: bonding the PE release film before rolling up.

Example 3

The high performance plastic magnetic material of the invention comprises a low surface energy layer, a magnetic layer and a printable layer.

The low surface energy layer is made of organic silicon pressure sensitive adhesive, and has a raw material ratio (mass part) as follows: 100 parts of vinyl-terminated poly (dimethyl siloxane), 130 parts of solvent ethyl acetate, and 3 parts of crosslinking agent; 2 part of accelerator KH570 and 3 parts of catalyst. The vinyl-terminated poly (dimethyl siloxane) and the solvent are added into a vessel and stirred thoroughly; the crosslinking agent and the accelerator are successively added; and 10-15 min later, the catalyst are finally added in and stirred thoroughly. The viscosity of vinyl-terminated poly (dimethyl siloxane) is 30000 mpa·s.

The raw material ratio of the magnetic layer is: 85% wt magnetic powder, 18% wt matrix component thermoplastic resin, 2% wt auxiliary. The iron powder is iron oxides, the matrix component is a mixture of polyethylene (PE) and EVA (mass ratio=1:1), the auxiliaries are antioxidant 1010, coupling agent, and lubricant stearic acid (mass ratio=1:1:1).

The printable layer is paper, PET or PP film with printable function, and PET or PP film with erasable function.

Step 1: mixing the iron powder, thermoplastic resin, auxiliaries at the above-mentioned ratio to form a mixture; on-line bonding the mixture with the printable layer through extrusion compounding to obtain the function film 1, i.e., bonding the magnetic layer with the printable layer.

Step 2: applying the prepared low surface energy layer liquid on the surface of the magnetic layer of the function film 1 through a transfer coating process, wherein the maximum temperature is 130° C., the curing time is 8 min, the thickness of the bonded layer is 50 micron, the thickness of the bonded layer is controlled by the adjustment of the gap between the transfer roller and the gumming roller.

Step 3: bonding the PE release film before rolling up.

Test:

The test results of the high performance plastic magnetic material of example 1 are given in Table 1. Specifically, in table 1, the content of the magnetic powder of the general plastic is 85%, and the magnetic powder is strontium ferrite, the content of the magnetic powder of the general backing adhesive plastic magnet is 85%, and the magnetic powder is strontium ferrite. The bonded strontium ferrite has a maximum magnetic energy product (BH) of 6-7.5 KJ/m and an attraction force of 10-15 g/cm.

TABLE 1

| Testing items | Adhesion force | Initial tack | Holding power | Total thickness | Magnetic attraction force | Residual adhesive test | Baking varnish board | High temperature resistance |
|---|---|---|---|---|---|---|---|---|
| General plastic magnet | — | — | — | 0.3 mm | 10-15 g/cm2 | — | — | — |
| General backing adhesive plastic magnet | 0 class | 3#-10# | No slip after 24 h | 0.33 mm | 160 g/cm2 | Has residual adhesive | High attraction force, immovable | Melting, squeezing out |
| Example 1 | 0 class | 3# | No slip after 24 h | 0.32 mm | 160 g/cm2 | No residual adhesive, movable | High attraction force, movable | No melting and no squeezing out at 80□ |

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

What is claimed is:

1. A plastic magnetic material, comprising an organic silicon pressure sensitive adhesive layer, a magnetic layer and a printable layer, wherein the magnetic layer and the printable layer are arranged successively on a first side of the organic silicon pressure sensitive adhesive layer;
   wherein the organic silicon pressure sensitive adhesive layer is prepared from the following raw materials: 100 parts of vinyl-terminated polysiloxane, 100-150 parts of solvent, 1-5 parts of crosslinking agent, 1-5 parts of accelerator, and 1-5 parts of catalyst; and
      wherein the magnetic layer comprises the following components:
   50% wt-90% wt magnetic powder, 7% wt-50% wt matrix component and 0-3% wt auxiliaries;
   wherein the vinyl-terminated polysiloxane is selected from a group consisting of vinyl-terminated dimethyl siloxane, vinyl-terminated dimethyl polysiloxane, vinyl-terminated poly (dimethyl siloxane) and combinations thereof, and the vinyl-terminated polysiloxane has a viscosity of 8,000-30,000 mPa*s at 25° C.;
   wherein the crosslinking agent is hydrosilicone oil; the catalyst is platinum compounds and/or platinum complexes; and the accelerator is a coupling agent;
   wherein the magnetic powder is at least one selected from the group consisting of hard magnetic material powder and soft magnetic material powder; the hard magnetic material powder is selected from strontium ferrite magnetic powder and barium ferrite magnetic powder, and the soft magnetic material powder is selected from iron, cobalt and nickel powders;
   wherein the matrix component is at least one selected from polyethylene (PE), polypropylene (PP), ethylene vinyl acetate (EVA), ethylene acrylic acid copolymer (EAA), ethylene ethyl acrylate (EEA), thermoplastic elastomer (TPE), thermoplastic polyurethanes (TPU), styrene-ethylene-butylene-styrene (SEBS), and styrene-butadiene-styrene (SBS).

2. The plastic magnetic material according to claim 1, wherein the printable layer is selected from the group consisting of paper, printable and writable plastic film, textile film, printable coating, and combinations thereof.

3. The plastic magnetic material according to claim 1, further comprising a release film arranged on a second side of the organic silicon pressure sensitive adhesive layer, opposite the first side.

* * * * *

UNITED STATES PATENT AND TRADEMARK OFFICE
CERTIFICATE OF CORRECTION

| | |
|---|---|
| PATENT NO. | : 11,192,347 B2 |
| APPLICATION NO. | : 15/896526 |
| DATED | : December 7, 2021 |
| INVENTOR(S) | : Xiaoming Wang et al. |

It is certified that error appears in the above-identified patent and that said Letters Patent is hereby corrected as shown below:

On the Title Page

Item (71), under "Applicant" should read:
"Guangzhou Newlife New Material Co., LTD, Guangzhou (CN)"

Signed and Sealed this
Twenty-fourth Day of May, 2022

Katherine Kelly Vidal
*Director of the United States Patent and Trademark Office*